United States Patent
Ishikawa

(10) Patent No.: US 7,304,970 B1
(45) Date of Patent: Dec. 4, 2007

(54) TRAFFIC CONTROL METHOD FOR MOBILE DATA COMMUNICATION, MOBILE STATION DEVICE AND BASE STATION DEVICE

(75) Inventor: Yoshihiro Ishikawa, Kanagawa (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/601,311

(22) PCT Filed: Dec. 6, 1999

(86) PCT No.: PCT/JP99/06814

§ 371 (c)(1),
(2), (4) Date: Aug. 4, 2000

(87) PCT Pub. No.: WO00/35235

PCT Pub. Date: Jun. 15, 2000

(30) Foreign Application Priority Data

Dec. 7, 1998 (JP) ............................... P10-347470

(51) Int. Cl.
*H04B 7/216* (2006.01)
*H04B 7/212* (2006.01)
*H04Q 7/20* (2006.01)

(52) U.S. Cl. .................. 370/335; 370/342; 370/347; 455/452.1

(58) Field of Classification Search ............... 370/328, 370/329, 335, 342, 331, 347; 455/422.1, 455/450–452.2, 453, 509, 513
See application file for complete search history.

(56) References Cited

U.S. PATENT DOCUMENTS 5,673,259 A 9/1997 Quick, Jr.

(Continued)

FOREIGN PATENT DOCUMENTS

EP 0 522 276 A2 1/1993

(Continued)

OTHER PUBLICATIONS

M. Nagatsuka, Technical Research Report by Institute of Electronics, vol. 97, No. 485, pp. 23-30, "Capacity Evaluation of Transmission Access Method in DS—CDMA Packet Transfer Communication", Jan. 1998.

(Continued)

*Primary Examiner*—Steven Nguyen
(74) *Attorney, Agent, or Firm*—Oblon, Spivak, McClelland, Maier & Neustadt, P.C.

(57) ABSTRACT

A traffic control method, a mobile station device and a base station device for mobile data communications that can realize improvement of communication quality and effective utilization of radio frequencies used in a mobile communication system using spread signals such as CDMA are disclosed. In a mobile communication system of a scheme using spread signals including CDMA, where two types of communication channels including a common channel and a plurality of individual channels are provided such that the common channel is set to be used by a plurality of users together and each individual channel is set to be used exclusively by one user, a communication using the common channel and the individual channel is carried out between a mobile radio terminal and a radio base station, and an admission judgement for a shift from the common channel to the individual channel is carried out at the radio base station or the mobile radio terminal, when a communication traffic at the mobile radio terminal is shifting from a sparse state to a dense state during the communication.

26 Claims, 10 Drawing Sheets

U.S. PATENT DOCUMENTS

| | | |
|---|---|---|
| 6,347,091 B1 * | 2/2002 | Wallentin et al. ........... 370/437 |
| 6,418,148 B1 * | 7/2002 | Kumar et al. ............... 370/468 |
| 6,434,130 B1 * | 8/2002 | Soininen et al. ............ 370/331 |
| 6,594,238 B1 * | 7/2003 | Wallentin et al. ......... 455/452.1 |
| 6,751,193 B1 * | 6/2004 | Kudrimoti et al. .......... 370/335 |

FOREIGN PATENT DOCUMENTS

| | | |
|---|---|---|
| JP | 10-65604 | 3/1998 |
| JP | 10-271089 | 10/1998 |
| WO | WO 98/47253 | 10/1998 |

OTHER PUBLICATIONS

J. C.-I. Chuang, IEEE Journal Selected Areas in Communications, vol. 16, No. 6, pp. 820-829, "Spectrum Resource Allocation for Wireless Packet Access with Internet Service", Aug. 1998.

Patent Abstracts of Japan, JP 11-266262, Sep. 28, 1999.

* cited by examiner

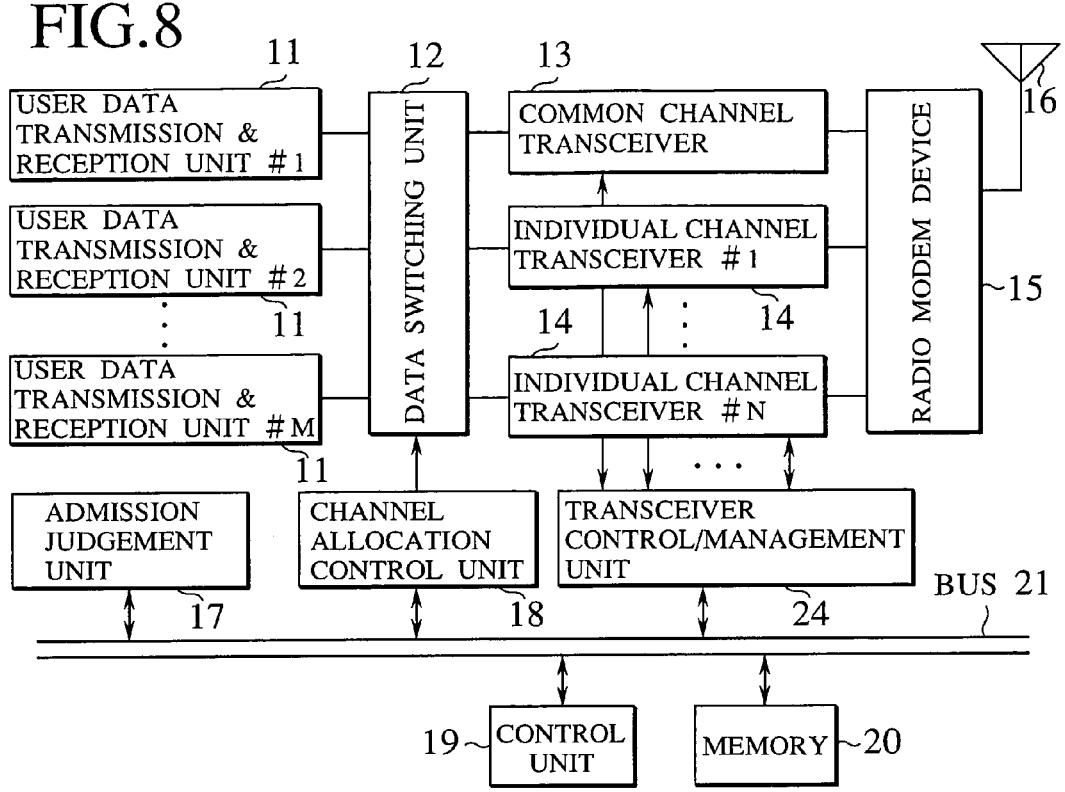
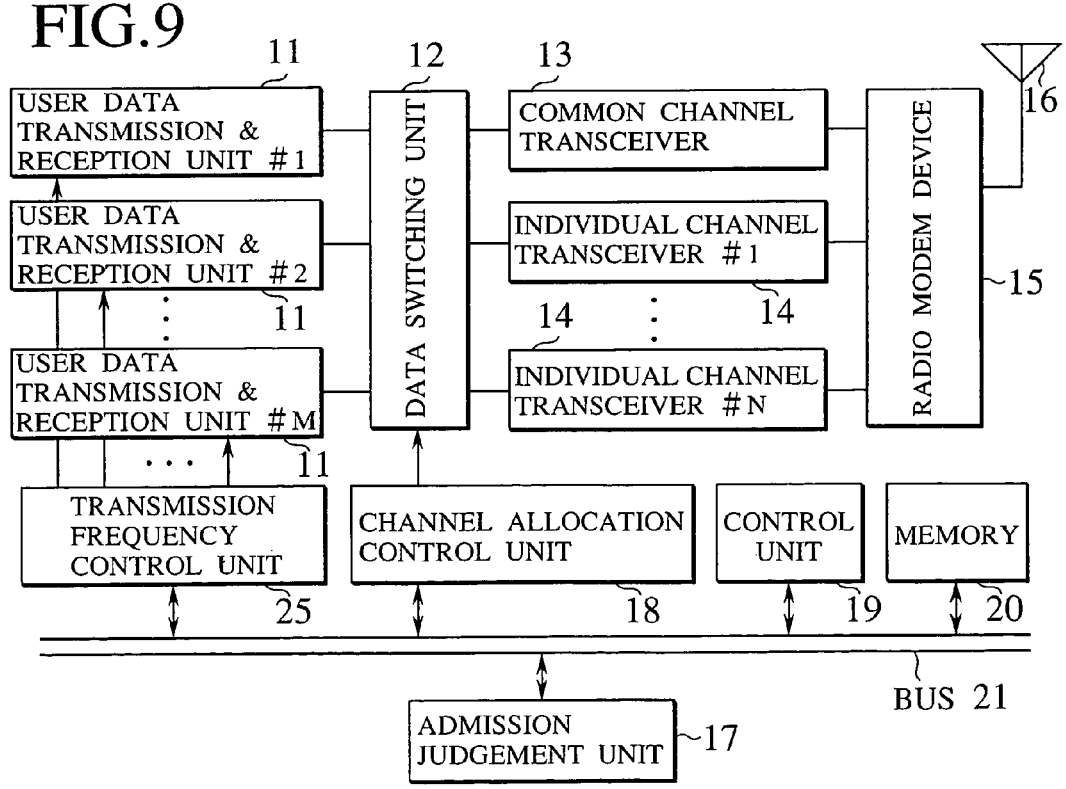

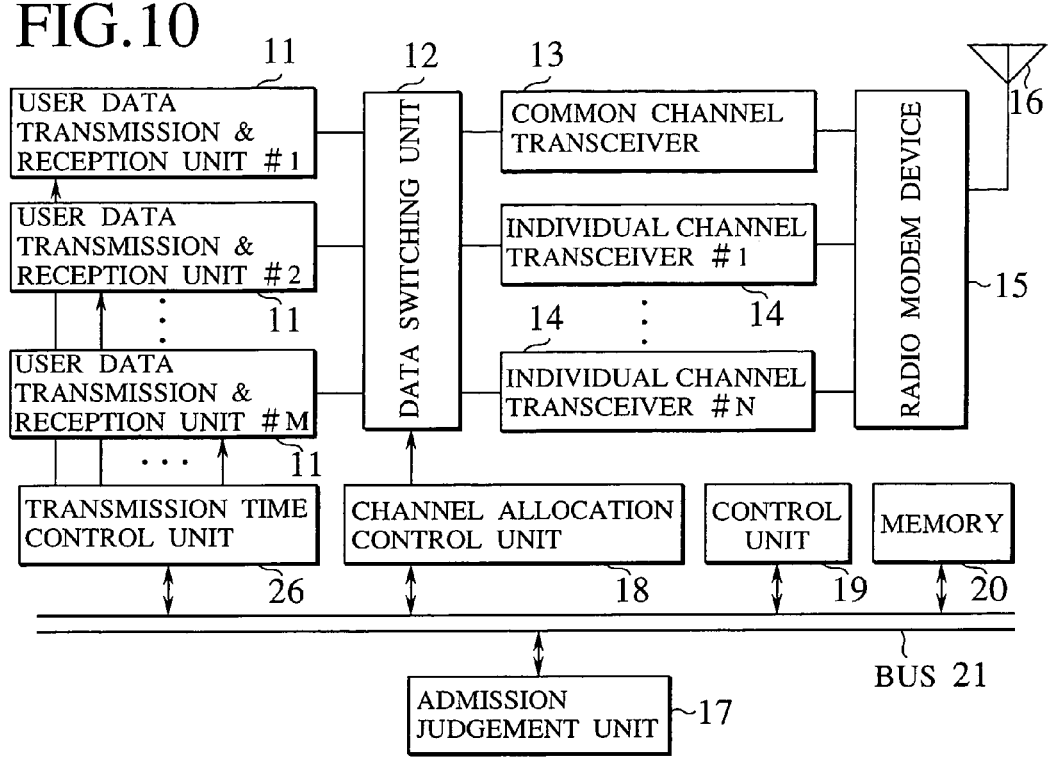
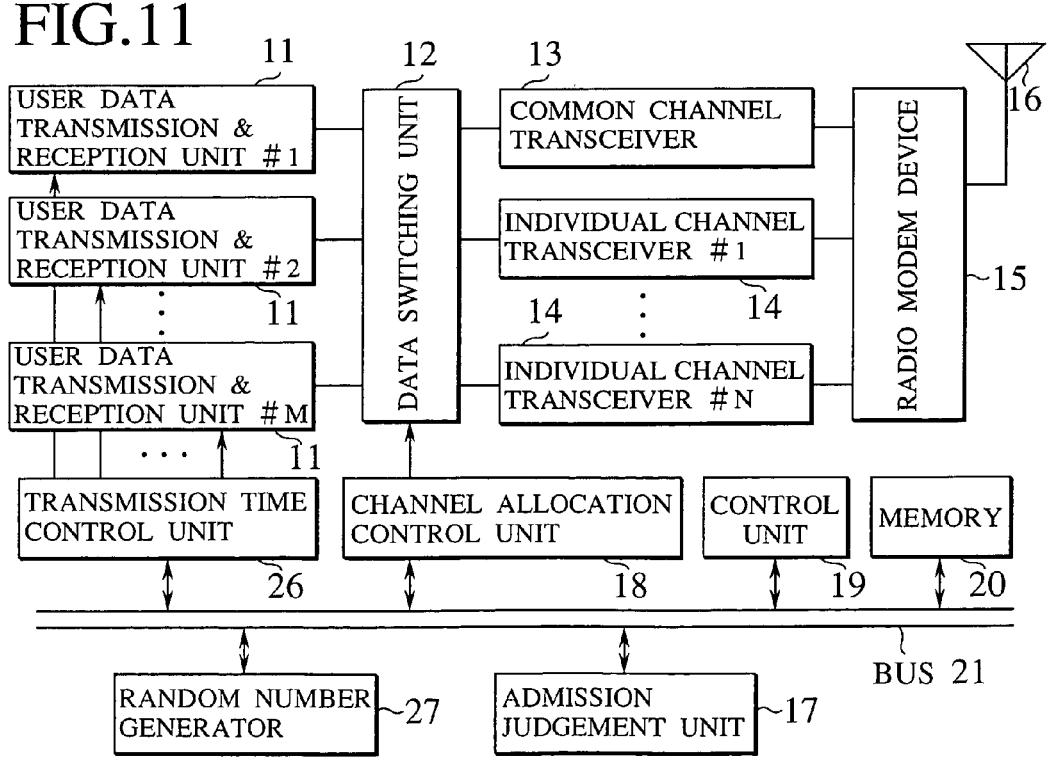

TRAFFIC CONTROL METHOD FOR MOBILE DATA COMMUNICATION, MOBILE STATION DEVICE AND BASE STATION DEVICE

TECHNICAL FIELD

The present invention relates to a traffic control method, a mobile station device and a base station device for mobile data communications that carry out a traffic control to determine whether or not to allocate a physical channel in a case of carrying out data communications in a mobile communication system using spread signals such as CDMA (Code Division Multiple Access).

BACKGROUND ART

In the mobile data communication system using CDMA or the like, channels for carrying out actual communications between a radio base station and a mobile radio terminal (mobile station) within a service area managed by the radio base station are classified according to their use as follows.

Namely, one is a common channel and the others are individual channels having a plurality of channels, where the former is a common channel to be used by a plurality of users together, which is used when a traffic from a user is sparse. The latter is a channel to be used exclusively by a user, which is set to be used when a communication traffic is dense. The data communications are carried out by appropriately switching between these two types of channels depending on a state of traffic from a user.

Also, in the mobile communication system using CDMA or the like, the judgement as to whether or not a call admission is possible is made by using a magnitude of an amount of interferences received at the radio base station, an information on a power level transmitted from the radio base station, and their respective prescribed thresholds. Moreover, in the mobile radio terminal, it is possible to judge a call admission autonomously at the mobile radio terminal by receiving a notification of information on an uplink interference amount and a downlink transmission power, information on thresholds, etc., from the radio base station through a broadcast channel.

However, in the mobile data communications which exchange data while switching a physical channel as described above, conventionally the judgement as to whether or not allocation is possible has not been carried out at a time of switching the physical channel, so that it has not been possible to prevent the quality degradation in the case where data traffics from a plurality of mobile stations are concentrated.

On the other hand, the call admission control that has conventionally been applied at the call level is also applicable to the data communications, but this method cannot suppress data transmission in the common channel, so that there has been a serious problem that no effect can be achieved by the straightforward application. Namely, when the admission is not possible as a result of the judgement, the mobile station will stay in the common channel and carry out data transmission in the common channel, but there has been a possibility of the quality degradation as the transmission radio signals sometimes give rise to interferences with respect to the other users who are communicating in the same band.

DISCLOSURE OF THE INVENTION

The object of the present invention is to provide a traffic control method, a mobile station device and a base station device for mobile data communications that can realize improvement of communication quality and effective utilization of radio frequencies used in a mobile communication system using spread signals such as CDMA.

The present invention provides a traffic control method for mobile data communications in a mobile communication system of a scheme using spread signals including CDMA, where two types of communication channels including a common channel and a plurality of individual channels are provided such that the common channel is set to be used by a plurality of users together and each individual channel is set to be used exclusively by one user, the traffic control method for mobile data communications characterized by carrying out a communication using the common channel and the individual channel, between a mobile radio terminal and a radio base station; and carrying out an admission judgement for a shift from the common channel to the individual channel at the radio base station or the mobile radio terminal, when a communication traffic at the mobile radio terminal is shifting from a sparse state to a dense state during the communication.

Also, the present invention is characterized in that the admission judgement for the shift from the common channel to the individual channel is carried out, at the radio base station according to information on an uplink interference amount which is an amount of received interferences and/or a downlink transmission power level which is a power level transmitted from the radio base station, or at the mobile radio terminal by receiving information on the uplink interference amount and/or the downlink transmission power level that is transmitted from the radio base station and according to the received information on the uplink interference amount and/or the downlink transmission power level.

Also, the present invention is characterized in that, when an admission of the shift is not possible as a result of the admission judgement for the shift from the common channel to the individual channel so that the communication is to be kept on the common channel, the radio base station and/or the mobile radio terminal are controlled such that data transmission is not carried out for a prescribed period of time or data transmission is carried out within a prescribed frequency, with regard to the communication.

Also, the present invention is characterized in that, when an admission of the shift is not possible as a result of the admission judgement for the shift from the common channel to the individual channel so that the communication is to be kept on the common channel, and the shift from the common channel to the individual channel is to be attempted again after controlling the radio base station and/or the mobile radio terminal such that data transmission is not carried out for the prescribed period of time or data transmission is carried out within the prescribed frequency with regard to the communication, a timing for restarting an individual channel set up operation is controlled to be different from other mobile radio terminals.

Also, the present invention is characterized in that the timing for restarting the individual channel set up operation is determined according to a random number.

In addition, the present invention provides a base station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, the base station device characterized by a communication unit for carrying out a communication using the common channel and the individual channel, with a mobile radio terminal; and an admission judgement unit for carrying out an admission judgement for a shift from the common channel to the individual channel, when a communication traffic state at the mobile radio terminal is shifting from a sparse state to a dense state during the communication.

Also, the present invention is characterized in that the admission judgement unit carries out the admission judgement according to information on an uplink interference amount which is an amount of interferences received at the base station device and/or a downlink transmission power level which is a power level transmitted from the base station device.

Also, the present invention is characterized by having a data transmission control unit for controlling the base station device and/or the mobile radio terminal such that data transmission is not carried out for a prescribed period of time or data transmission is carried out within a prescribed frequency, with regard to the communication, when an admission of the shift is not possible as a result of the admission judgement for the shift from the common channel to the individual channel so that the communication is to be kept on the common channel.

Also, the present invention is characterized by having a transmission time control unit for controlling a timing for restarting an individual channel set up operation to be different from other mobile radio terminals, when an admission of the shift is not possible as a result of the admission judgement for the shift from the common channel to the individual channel so that the communication is to be kept on the common channel, and the shift from the common channel to the individual channel is to be attempted again after controlling the base station device and/or the mobile radio terminal such that data transmission is not carried out for the prescribed period of time or data transmission is carried out within the prescribed frequency with regard to the communication.

Also, the present invention is characterized in that the transmission time control unit determines the timing for restarting the individual channel set up operation according to a random number.

In addition, the present invention provides a mobile station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, the mobile station device characterized by a communication unit for carrying out a communication using the common channel and the individual channel, with a radio base station; and an admission judgement unit for carrying out an admission judgement for a shift from the common channel to the individual channel, when a communication traffic state at the mobile station device is shifting from a sparse state to a dense state during the communication.

Also, the present invention is characterized in that the admission judgement unit carries out the admission judgement by receiving information on an uplink interference amount which is an amount of interferences received at the radio base station and/or a downlink transmission power level which is a power level transmitted from the radio base station and according to the received information on the uplink interference amount and/or the downlink transmission power level.

Also, the present invention is characterized by having a data transmission control unit for controlling the mobile station device and/or the radio base station such that data transmission is not carried out for a prescribed period of time or data transmission is carried out within a prescribed frequency, with regard to the communication, when an admission of the shift is not possible as a result of the admission judgement for the shift from the common channel to the individual channel so that the communication is to be kept on the common channel.

Also, the present invention is characterized by having a transmission time control unit for controlling a timing for restarting an individual channel set up operation to be different from other mobile radio terminals, when an admission of the shift is not possible as a result of the admission judgement for the shift from the common channel to the individual channel so that the communication is to be kept on the common channel, and the shift from the common channel to the individual channel is to be attempted again after controlling the mobile station device and/or the radio base station such that data transmission is not carried out for the prescribed period of time or data transmission is carried out within the prescribed frequency with regard to the communication.

Also, the present invention is characterized in that the transmission time control unit determines the timing for restarting the individual channel set up operation according to a random number.

BRIEF DESCRIPTION OF THE DRAWINGS

FIG. 8 is a block diagram showing a third exemplary configuration of a base station device according to one embodiment of the present invention.

FIG. 9 is a block diagram showing a fourth exemplary configuration of a base station device according to one embodiment of the present invention.

FIG. 10 is a block diagram showing a fifth exemplary configuration of a base station device according to one embodiment of the present invention.

FIG. 11 is a block diagram showing a sixth exemplary configuration of a base station device according to one embodiment of the present invention.

BEST MODE FOR CARRYING OUT THE INVENTION

Figure 1:
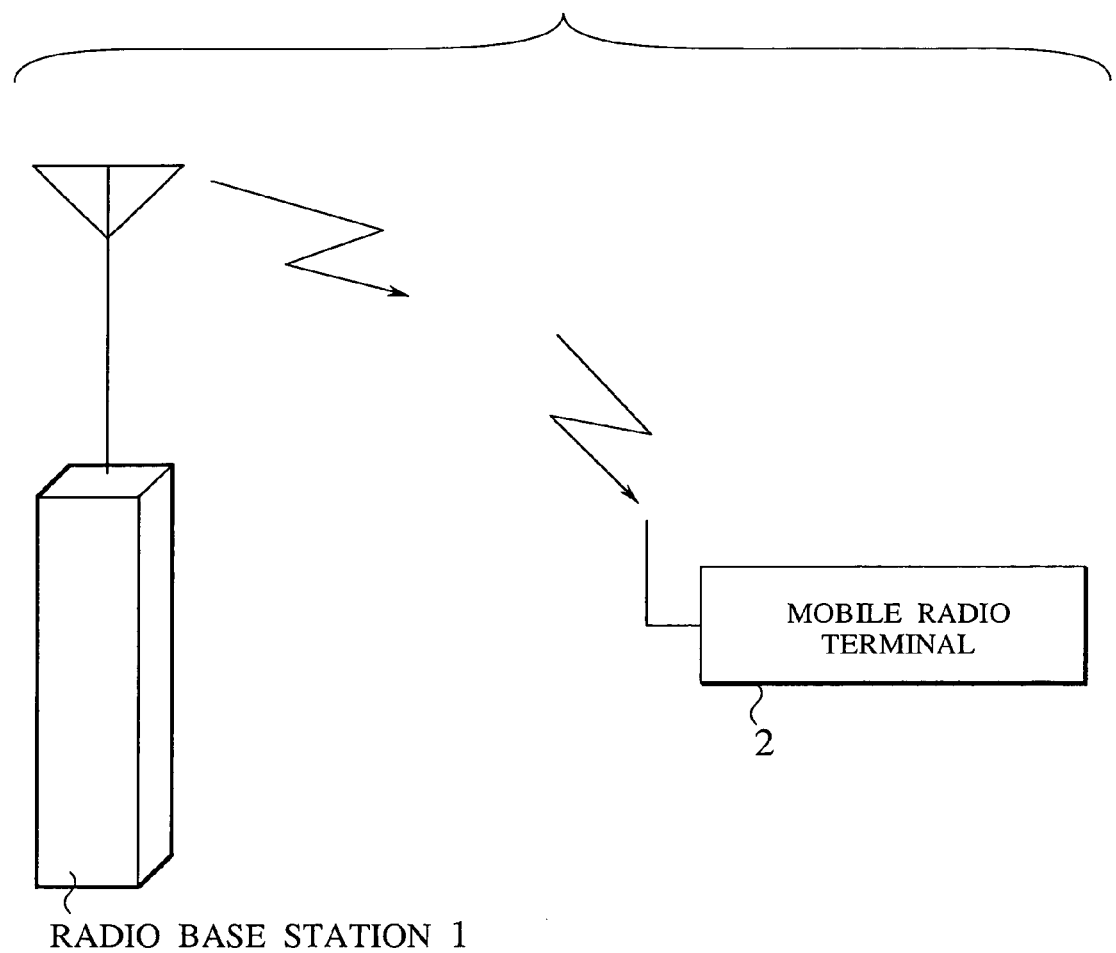
FIG. 1 is a diagram showing a schematic configuration of a mobile communication system to which a traffic control method for mobile data communications according to one embodiment of the present invention is applied.

In the following, the embodiment of the present invention will be described using drawings. FIG. 1 shows a schematic configuration of a mobile communication system to which the traffic control method for mobile data communications according to one embodiment of the present invention is applied. In this mobile communication system, many radio base stations are distributedly provided to form respective service areas, and many mobile radio terminals (mobile stations) 2 for carrying out data communications with respect to each radio base station 1 are existing inside the service area managed by each radio base station 1 and are actually carrying out the data communications. Note that, in FIG. 1, only one radio base station 1 and only one mobile radio terminal 2 that is carrying out the data communications with respect to that radio base station 1 are shown and the others are omitted for the sake of simplicity.

Figure 2:
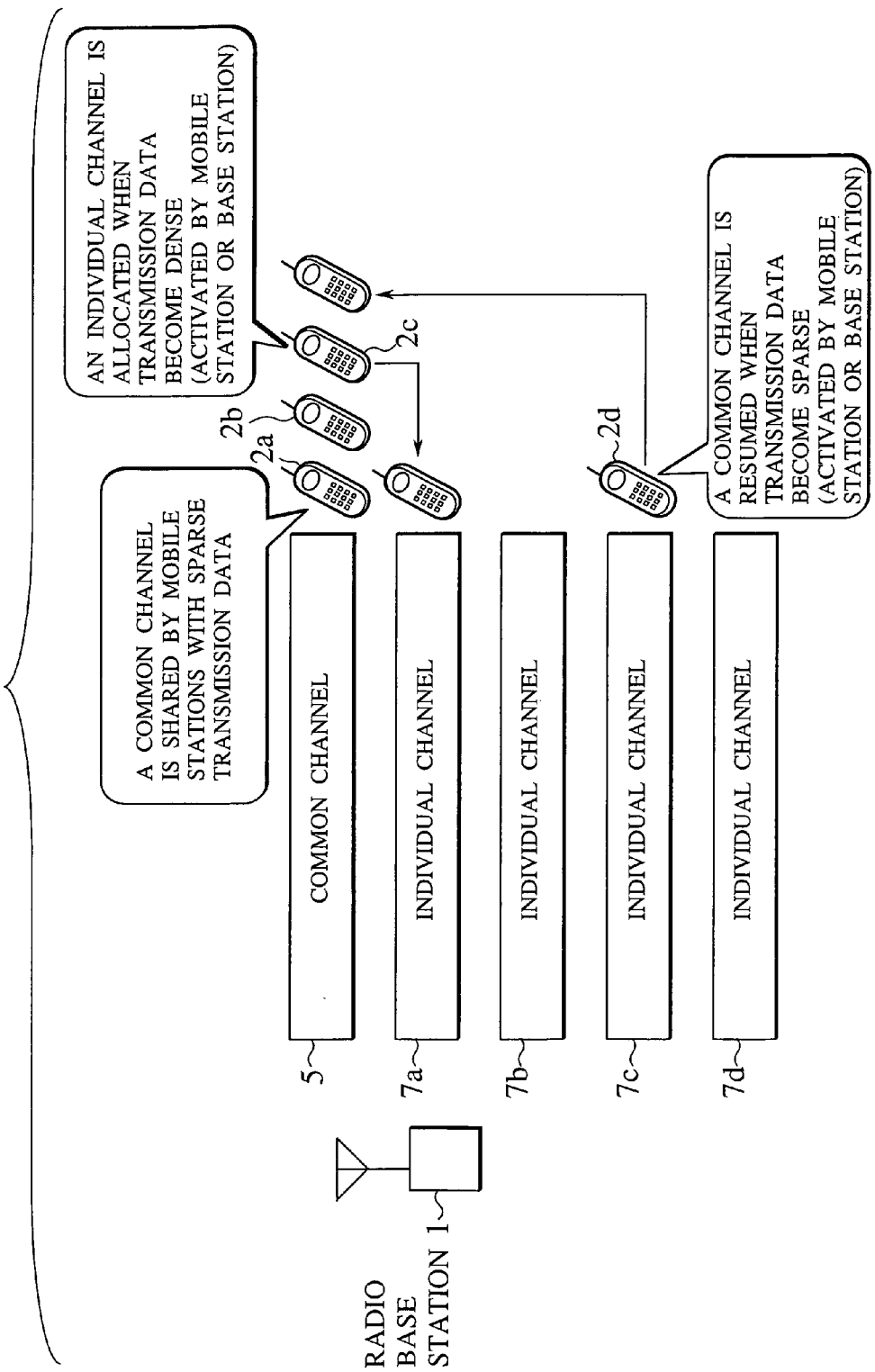
FIG. 2 is a diagram for explaining a method for using a common channel and individual channels in the mobile communication system shown in FIG. 1.

Here, with reference to FIG. 2, the method of using a common channel and individual channels in the mobile communication system shown in FIG. 1 will be described. As shown in FIG. 2, the mobile communication system is provided with two types of radio channels including a common channel 5 and a plurality of individual channels 7a-7d for the purpose of communications between the radio base station 1 and the mobile radio terminal 2, where it is set such that the common channel 5 is used together by a plurality of users who have respective mobile radio terminals 2, and each individual channel 7 is used exclusively by one user who has the mobile radio terminal 2.

In further detail, the mobile radio terminal 2 for which data to be transmitted are sparse will use the common channel 5 together with the other mobile radio terminals 2 in the communication between the radio base station 1 and the mobile radio terminal 2. Also, the mobile radio terminal 2 for which data to be transmitted are dense will use the individual channel 7 exclusively for the communication with the radio base station 1. In addition, when data of the mobile radio terminal 2 that has been carrying out the communication using the common channel 5 become dense, the individual channel 7 is allocated and a shift to the individual channel 7 is made. Conversely, when data of the mobile radio terminal 2 that has been carrying out communication using the individual channel 7 become sparse, it is returned to the common channel 5. Note that the activation of these channel shifts can be made by either the mobile radio terminal 2 or the radio base station 1.

Now FIG. 2 will be described in further detail. The mobile radio terminals 2a and 2b have sparse data to be transmitted so that they are carrying out the communications using the common channel 5 together. Also, the mobile radio terminal 2c had been carrying out the communication using the common channel 5 as data to be transmitted were sparse, but the individual channel 7a is allocated and the communication is carried out using this individual channel 7a as the transmission data became dense in a middle. In addition, the mobile radio terminal 2d had been carrying out the communication using the individual channel 7c as the transmission data were dense initially, but the communication is continued by returning to the common channel 5 as the transmission data became sparse in a middle.

Figure 3:
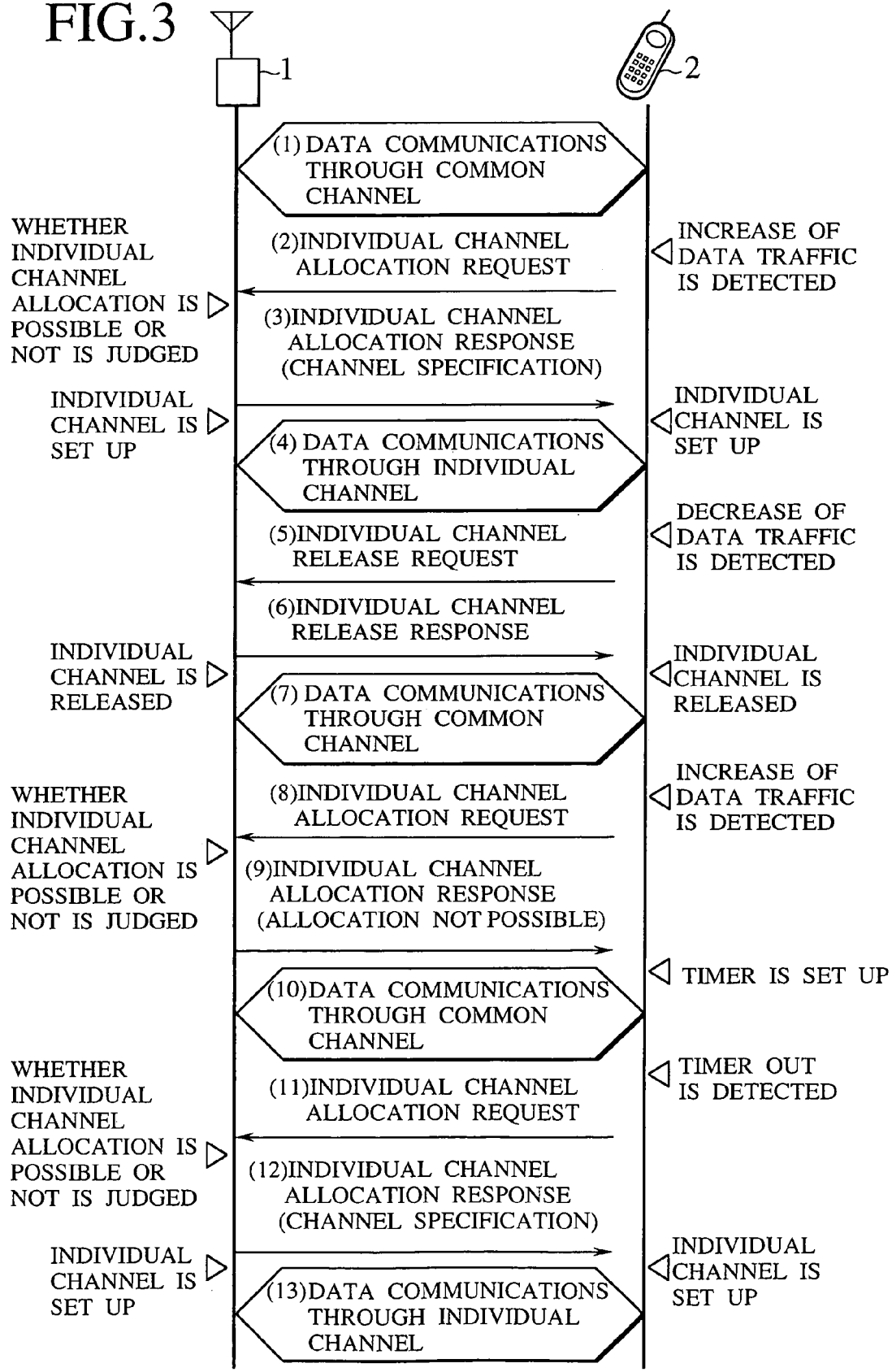
FIG. 3 is a sequence chart showing a flow of operations in the mobile communication system shown in FIG. 1.

Next, with reference to the sequence chart shown in FIG. 3, a flow of the operation in the mobile communication system of the present embodiment, especially a transition of states in the case where the data traffic to be communicated changes while the mobile radio terminal 2 is carrying out the communication using the common channel 5 with the radio base station 1.

First, the radio base station 1 and the mobile radio terminal 2 are carrying out the data communication through the common channel 5 (1), but when the mobile radio terminal 2 detects an increase of the data traffic between them, the allocation of the individual channel 7 is requested from the mobile radio terminal 2 to the radio base station 1 (2). The radio base station 1 judges whether or not the allocation of the individual channel 7 (an admission of a shift from the common channel to the individual channel) is possible in response to this request, and when it is judged that the allocation is possible, it transmits an individual channel allocation response containing an individual channel specification to the mobile radio terminal 2 (3). According to this, the mobile radio terminal 2 sets up the individual channel 7 and makes a shift to the individual channel 7, and the mobile ratio terminal 2 and the radio base station 1 continue the data communication through the individual channel 7 (4).

When the mobile radio terminal 2 detects a decrease of the data traffic during the data communication using the individual channel 7 between the radio base station 1 and the mobile radio terminal 2, the mobile radio terminal 2 requests a release of the individual channel 7 to the radio base station 1 (5). The radio base station 1 makes a release response for the individual channel 7 in response to this request (6). The individual channel 7 is released by this, and both of them make a shift to the common channel 5 and continue the data communication through the common channel 5 (7).

When the mobile radio terminal 2 detects an increase of the data traffic at the mobile radio terminal 2 again during the data communication using the common channel 5 by the radio base station 1 and the mobile radio terminal 2, the mobile radio terminal 2 makes an allocation request for the individual channel 7 to the radio base station 1 (8). The radio base station 1 judges whether or not the allocation of the individual channel is possible in response to this request, and when it is judged that a shift to the individual channel is not possible as the traffic in the service area is large as a result of this judgement, it transmits an individual channel allocation impossible response to the mobile radio terminal 2 (9). Upon receiving this response, the mobile radio terminal 2 sets a timer and continues the data communication through the common channel 5 (10).

When the timer out is detected at the mobile radio terminal 2, the mobile radio terminal 2 makes an allocation request for the individual channel 7 again (11). the radio base station 1 judges whether or not the allocation of the individual channel 7 is possible in response to this request, and when it is judged that a shift to the individual channel 7 is possible as a result of this judgement, it transmits an individual channel allocation response containing a channel specification to the mobile radio terminal 2 (12). The mobile radio terminal 2 receives this, sets up the individual channel 7 and makes a shift to the individual channel 7, and the mobile radio terminal 2 and the radio base station 1 continue the data communication through the individual channel 7 (13).

Note that, in FIG. 3, the detection of an increase or a decrease of the data traffic may be made on the radio base station 1 side, or on each of the radio base station 1 and the mobile radio terminal 2 independently.

Also, the judgement as to whether or not the allocation of the individual channel is possible may be made on the mobile radio terminal 2 side.

Also, the timer setting and the timer out detection may be carried out on the radio base station 1 side.

Next, with reference to the flow chart shown in FIG. 4, one exemplary operation procedure in the mobile communication system of the present embodiment will be described in detail.

First, when the radio base station 1 and the mobile radio terminal 2 start their operations, a logical communication path is set up between the radio base station 1 and the mobile radio terminal 2 (steps S1, S2). Thereafter, the radio base station 1 starts transmission of communication signals destined to the mobile radio terminal 2 through the common channel (step S3), the mobile radio terminal 2 receives signals from the radio base station 1 and starts transmission of communication signals through the common channel to the radio base station 1 (step S4), and the radio base station 1 receives signals from the mobile radio terminal 2 (step S5) such that it becomes a data communication state using the common channel between the radio base station 1 and the mobile radio terminal 2 (step S6).

Next, as the increase of the traffic is detected or the timer out as described below is detected at the radio base station 1, or as the increase of the traffic is detected at the mobile radio terminal 2, the individual channel set up operation is started (steps S7, S8). Then, at the radio base station 1, measurements of an uplink reception interference level (uplink interference amount) and a downlink transmission power level are carried out (step S9) and whether the uplink reception interference level and the downlink transmission power level are not greater than their respectively corresponding prescribed thresholds or not is judged (step S10). As a result, when it is judged that the uplink reception interference level and the downlink transmission power level are greater than their respective thresholds (step S10 NO), it is judged that the shift to the individual channel is impossible as the communication traffic within this service area is large and the communication is continued through the common channel, but a limitation on the signal transmission operation through the common channel is set at this point as will be described below (step S11). Here it is possible to set a limitation only on the signal transmission operation by the radio base station 1, or on the signal transmission operations by both the radio base station 1 and the mobile radio terminal 2. Instead of this, it is also possible to prohibit transmission for a certain period of time. This is done in order to reduce the influence of interferences to the other communications.

Next, at the radio base station 1, the timer is set according to a random number or the like (step S12), such that the individual channel set up operation will be restarted by the timer out detection at the step S7, and it is returned to the data communication state using the common channel of the step S6. Here, the reason for determining the timing for restarting the individual channel set up operation according to a random number or the like is to prevent the increase of interferences by making the timing for restarting the individual channel set up operation different from the other mobile radio terminals. In this way the effectiveness of the frequency utilization in the system can be improved. Note that it is not absolutely necessary to use a random number as long as it is effective for this prevention of the increase of interferences, and it is possible to use other methods such as a method utilizing an ID of the mobile radio terminal for example.

Note that the timer setting at the step S12 and the timer out detection at the step S7 may be carried out at the mobile radio terminal 2 side as in FIG. 3.

On the other hand, when it is judged that the measured values of the uplink reception interference level and the downlink transmission power level are not greater than their respectively corresponding prescribed thresholds at the step S10 (step S10 YES), it is judged that the shift to the individual channel is possible as the communication traffic within the service area is not so large, and the data communication through the common channel is shifted to the individual channel immediately (step S14).

The result of the admission judgement for the shift from the common channel to the individual channel (the judgement as to whether or not the individual channel allocation is possible) at the step S10 is notified from the radio base station 1 to the mobile radio terminal 2, and when this admission judgement result indicates that the admission is not possible (step S13 NO), the mobile radio terminal 2 returns to the data communication state using the common channel of the step S6, but when this admission judgement result indicates that the admission is possible (step S13 YES), the data communication through the common channel is shifted to the individual channel immediately (step S15).

After the shift to the individual channel, the radio base station 1 starts transmission of the communication signals destined to the mobile radio terminal 2 through the individual channel (step S16), the mobile radio terminal 2 receives signals from the radio base station 1 and starts transmission of the communication signals through the individual channel to the radio base station 1 (step S17), and the radio base station 1 receives signals from the mobile radio terminal 2 (step S18), such that it becomes a data communication state using the individual channel between the radio base station 1 and the mobile radio terminal 2 (step S19).

Figure 5:
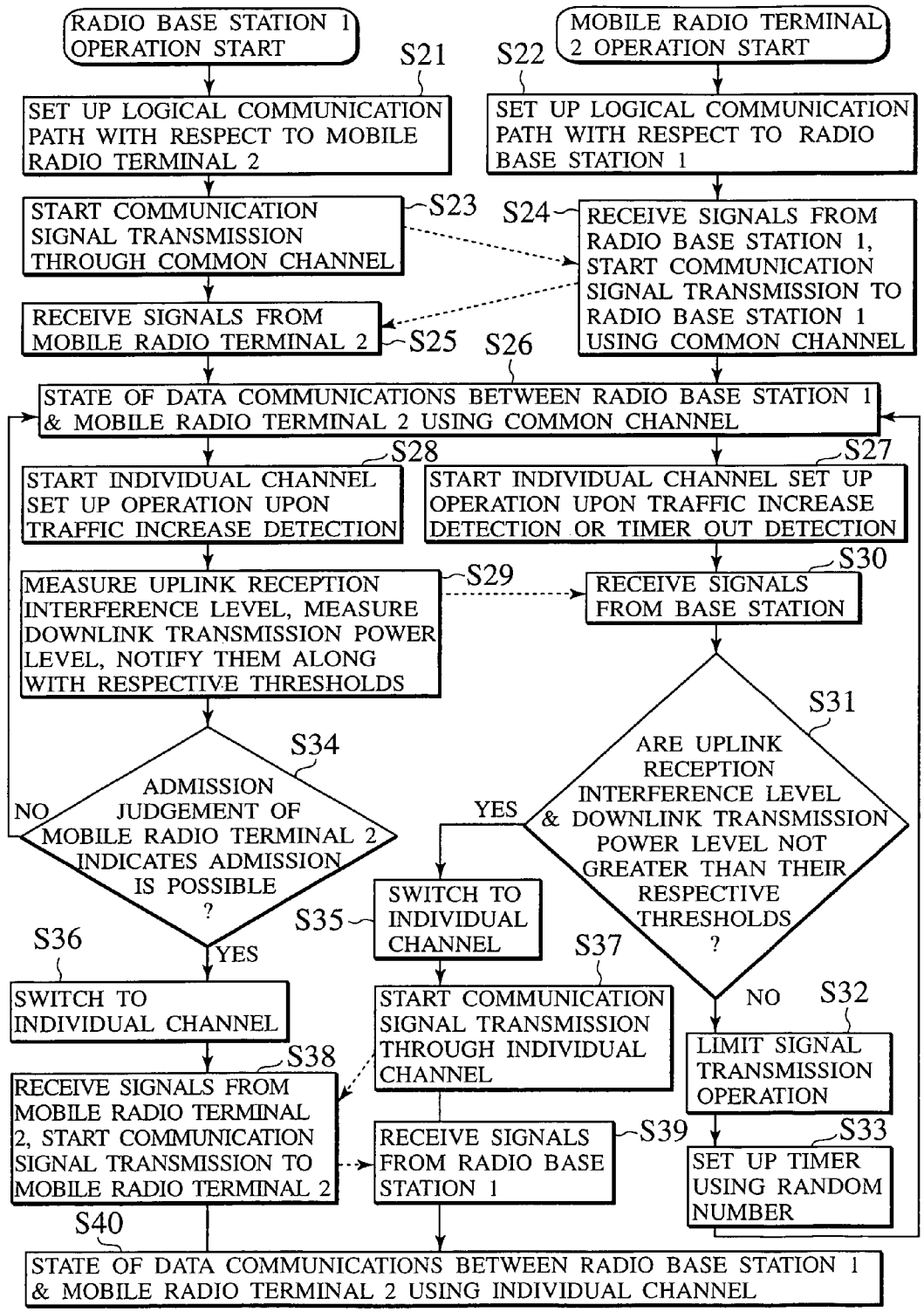
FIG. 5 is a flow chart showing another exemplary operation procedure in the mobile communication system shown in FIG. 1.

Next, with reference to the flow chart of FIG. 5, the operation procedure in the mobile communication system of the present embodiment for the case where information on the measured values of the uplink reception interference level and the downlink transmission power level that are measured at the radio base station 1 and their respectively corresponding prescribed thresholds is notified to the mobile radio terminal 2 and the mobile radio terminal 2 actively carries out the operation up to a start of exchanges for the data communication will be described.

Figure 4:
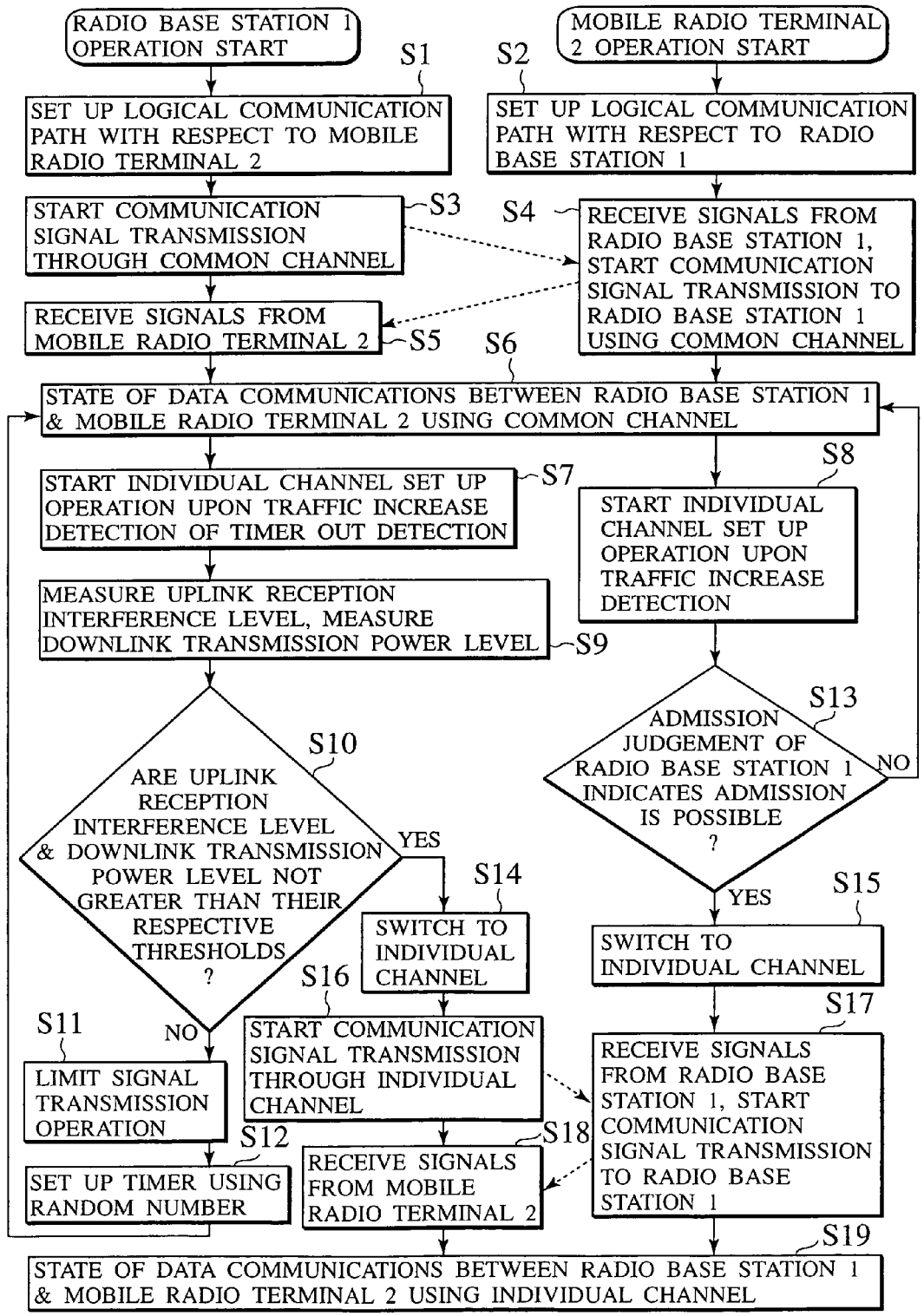
FIG. 4 is a flow chart showing one exemplary operation procedure in the mobile communication system shown in FIG. 1.

In FIG. 5, similarly as in FIG. 4, first, when the radio base station 1 and the mobile radio terminal 2 start their operations, a logical communication path is set up between the radio base station 1 and the mobile radio terminal 2 (steps S21, S22). Thereafter, the radio base station 1 starts transmission of communication signals destined to the mobile radio terminal 2 through the common channel (step S23), the mobile radio terminal 2 receives signals from the radio base station 1 and starts transmission of communication signals through the common channel to the radio base station 1 (step S24), and the radio base station 1 receives signals from the mobile radio terminal 2 (step S25) such that it becomes a data communication state using the common channel between the radio base station 1 and the mobile radio terminal 2 (step S26).

Next, as the increase of the traffic is detected or the timer out as described below is detected at the mobile radio terminal 2, or as the increase of the traffic is detected at the radio base station 1, the individual channel set up operation is started (steps S27, S28). Then, at the radio base station 1, measurements of an uplink reception interference level (uplink interference amount) and a downlink transmission power level are carried out (step S29) and information on these measured values is notified along with their respectively corresponding prescribed thresholds to the mobile radio terminal 2 through the common channel, and the mobile radio terminal 2 receives this signal from the radio base station 1 (step S30).

Then, the mobile radio terminal 2 judges whether the uplink reception interference level and the downlink transmission power level are not greater than their respectively corresponding prescribed thresholds or not (step S31). As a result, when it is judged that the uplink reception interference level and the downlink transmission power level are greater than their respective thresholds (step S31 NO), it is judged that the shift to the individual channel is impossible as the communication traffic within this service area is large and the communication is continued through the common channel, but a limitation on the signal transmission operation through the common channel is set at this point as will be described below (step S32). Here it is possible to set a limitation only on the signal transmission operation by the mobile radio terminal 2, or on the signal transmission operations by both the radio base station 1 and the mobile radio terminal 2. Instead of this, it is also possible to prohibit transmission for a certain period of time. This is done in order to reduce the influence of interferences to the other communications.

Next, at mobile radio terminal 2, the timer is set according to a random number or the like (step S33), such that the individual channel set up operation will be restarted by the timer out detection at the step S27, and it is returned to the data communication state using the common channel of the step S26. Here, the reason for determining the timing for restarting the individual channel set up operation according to a random number or the like is to prevent the increase of interferences by making the timing for restarting the individual channel set up operation different from the other mobile radio terminals. In this way the effectiveness of the frequency utilization in the system can be improved. Note that it is not absolutely necessary to use a random number as long as it is effective for this prevention of the increase of interferences, and it is possible to use other methods such as a method utilizing an ID of the mobile radio terminal for example.

Note that the timer setting at the step S33 and the timer out detection at the step S27 may be carried out at the radio base station 1 side.

On the other hand, when it is judged that the measured values of the uplink reception interference level and the downlink transmission power level are not greater than their respectively corresponding prescribed thresholds at the step S31 (step S31 YES), it is judged that the shift to the individual channel is possible as the communication traffic within the service area is not so large, and the data communication through the common channel is shifted to the individual channel immediately (step S35).

The result of the admission judgement for the shift from the common channel to the individual channel (the judgement as to whether or not the individual channel allocation is possible) at the step S31 is notified from the mobile radio terminal 2 to the radio base station 1, and when this admission judgement result indicates that the admission is not possible (step S34 NO), the radio base station 1 returns to the data communication state using the common channel of the step S26, but when this admission judgement result indicates that the admission is possible (step S34 YES), the data communication through the common channel is shifted to the individual channel immediately (step S36).

After the shift to the individual channel, the mobile radio terminal 2 starts transmission of the communication signals destined to the radio base station 1 through the individual channel (step S37), the radio base station 1 receives signals from the mobile radio terminal 2 and starts transmission of the communication signals through the individual channel to the mobile radio terminal 2 (step S38), and the mobile radio terminal 2 receives signals from the radio base station 1 (step S39), such that it becomes a data communication state using the individual channel between the radio base station 1 and the mobile radio terminal 2 (step S40).

The above description of the operation procedure is related to a part of the processing of FIG. 3, but the operations related to the other state changes shown in FIG. 3 are also executed by procedures similar to FIG. 4 and FIG. 5 described above.

In the operation procedures of FIG. 4 and FIG. 5 described above, as the limitation on the operations to transmit signals through the common channel that is to be set after judging whether or not the allocation of the individual channel is possible at the radio base station or the mobile radio terminal and keeping the communication on the common channel in the case where the allocation is not possible, the radio base station or the mobile radio terminal can be made not to carry out transmission of data for a prescribed period of time or made to carry out transmission of data within a prescribed frequency. By carrying out such a transmission control in the common channel, it becomes possible to prevent the degradation of the communication quality of the other users who are communicating in the same frequency band.

Note that a value of the prescribed period of time or the prescribed frequency that is used in such a transmission control in the common channel can be made variable or selectable from a plurality of candidates, such that it becomes possible to realize the adaptive control according to the traffic within the service area.

Also, the respectively corresponding prescribed thresholds for the uplink reception interference level and the downlink transmission power level that are used at the radio base station or the mobile radio terminal can be made variable or different for each radio base station or mobile radio terminal.

Note that, in the operation procedures of FIG. 4 and FIG. 5 described above, whether the traffic within the service area is large or not is judged using both the uplink reception interference level and the downlink transmission power level, but it is not absolutely necessary to use both of them together, and it is possible to judge whether the traffic within the service area is large or not using only either one of the uplink reception interference level and the downlink transmission power level.

In addition, it is also possible to use the judgement criteria other than the uplink reception interference level and the downlink transmission power level in this judgement as to whether or not the allocation is possible. For example, the number of spread codes available in the mobile communication system is finite so that it is possible to judge that the allocation is not possible when there is no available spread code, or that the allocation is possible otherwise. In this case, in the scheme where the judgement as to whether or not the allocation is possible is carried out at the mobile station side as in FIG. 5, it suffices to notify information regarding either the remaining number of codes or the presence/absence of the available spread codes to the mobile station. Else, as another example, it is possible to judge that the allocation is not possible when there is no available transceiver, or that the allocation is possible otherwise. In this case, in the scheme where the judgement as to whether or not the allocation is possible is carried out at the mobile station side as in FIG. 5, it suffices to notify information regarding either the remaining number of transceivers or the presence/absence of the available transceivers to the mobile station.

Also, in the operation procedures of FIG. 4 and FIG. 5 described above, the radio base station 1 and the mobile radio terminal 2 detect the increase of the data traffic by monitoring the traffic transmitted by the own station independently, but it is possible to detect the increase of the data traffic by monitoring the traffics of the both stations simultaneously at either one of the radio base station 1 and the mobile radio terminal 2. In any case, a side that detected the increase of the data traffic or the timer out needs to notify the restart of the individual channel set up operation to the other side.

Next, with references to FIG. 6 to FIG. 11, exemplary configurations of a base station device in the present embodiment will be described.

Figure 6:
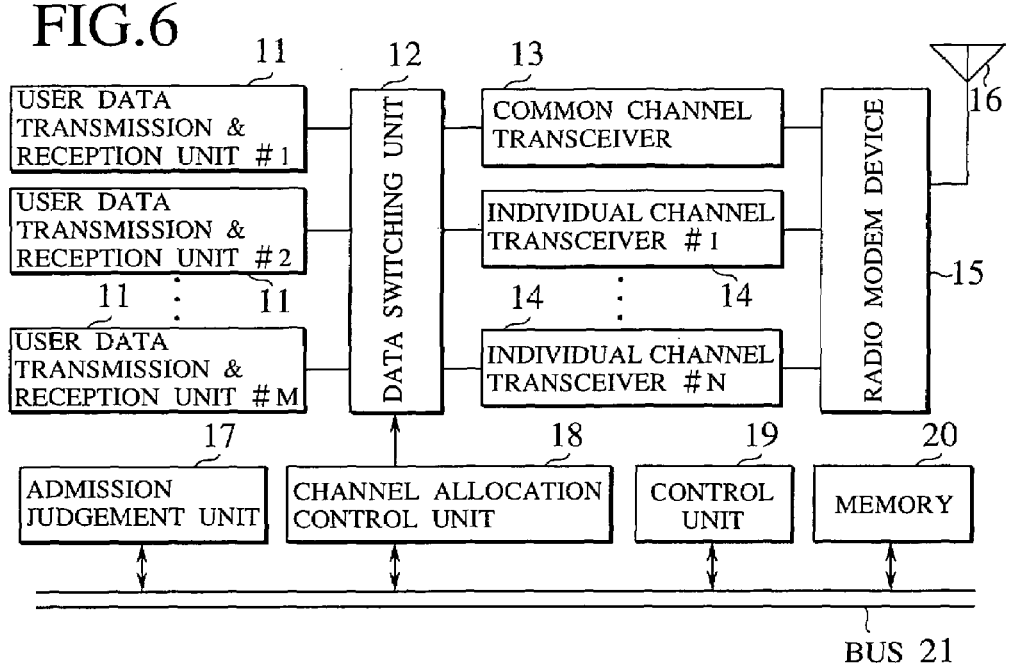
FIG. 6 is a block diagram showing a first exemplary configuration of a base station device according to one embodiment of the present invention.

FIG. 6 shows the first exemplary configuration of the base station device in the present embodiment. In this exemplary configuration, the base station device comprises a plurality of user data transmission and reception units 11, a data switching unit 12 connected with these user data transmission and reception units 11, one common channel transceiver 13 and a plurality of individual channel transceivers 14 that are connected with this data switching unit 12, a radio modem device 15 connected with these common channel transceiver 13 and individual channel transceivers 14, an antenna 16 connected with this radio modem device 15, an admission judgement unit 17, a channel allocation control unit 18 connected with the data switching unit 12, a control unit 19, a memory 20, and a bus 21 for interconnecting these admission judgement unit 17, channel allocation control unit 18, control unit 19 and memory 20.

Each user data transmission and reception unit 11 carries out transmission and reception of user data. In FIG. 6, M sets of the user data transmission and reception units 11 are shown on an assumption that one transmission and reception unit will be used per one user.

The data switching unit 12 maps data transmitted from the user data transmission and reception unit 11 onto the common channel or the individual channel.

The common channel transceiver 13 carries out an error correction encoding and a processing for mapping onto radio frames as the processing necessary for transmitting data specified from the data switching unit 12 onto the common channel. It also carries out a processing for extracting from radio frames and decoding data transmitted from the mobile station on the common channel.

Each individual channel transceiver 14 carries out an error correction encoding and a processing for mapping onto radio frames as the processing necessary for transmitting data specified from the data switching unit 12 onto the individual channel. It also carries out a processing for extracting from radio frames and decoding data transmitted from the mobile station on the individual channel.

The radio modem device 15 carries out a spreading processing and a radio frequency modulation with respect to radio frames transmitted from the common channel transceiver 13 or the individual channel transceivers 14, and transmits them to the antenna 16. It also carries out a conversion to the baseband frequency and a despreading processing by tuning to radio signals received from the antenna 16.

The admission judgement unit 17 makes the judgement as to whether or not the allocation of the individual channel is possible (the judgement as to whether or not the admission of the shift from the common channel to the individual channel is possible).

The channel allocation control unit 18 controls the data switching unit 12 to set correspondences between the user data transmission and reception units 11 and the common channel transceiver 13 or the individual channel transceivers 14.

The control unit 19 carries out an overall control of the base station device.

The memory 20 stores and memorizes data.

Figure 7:
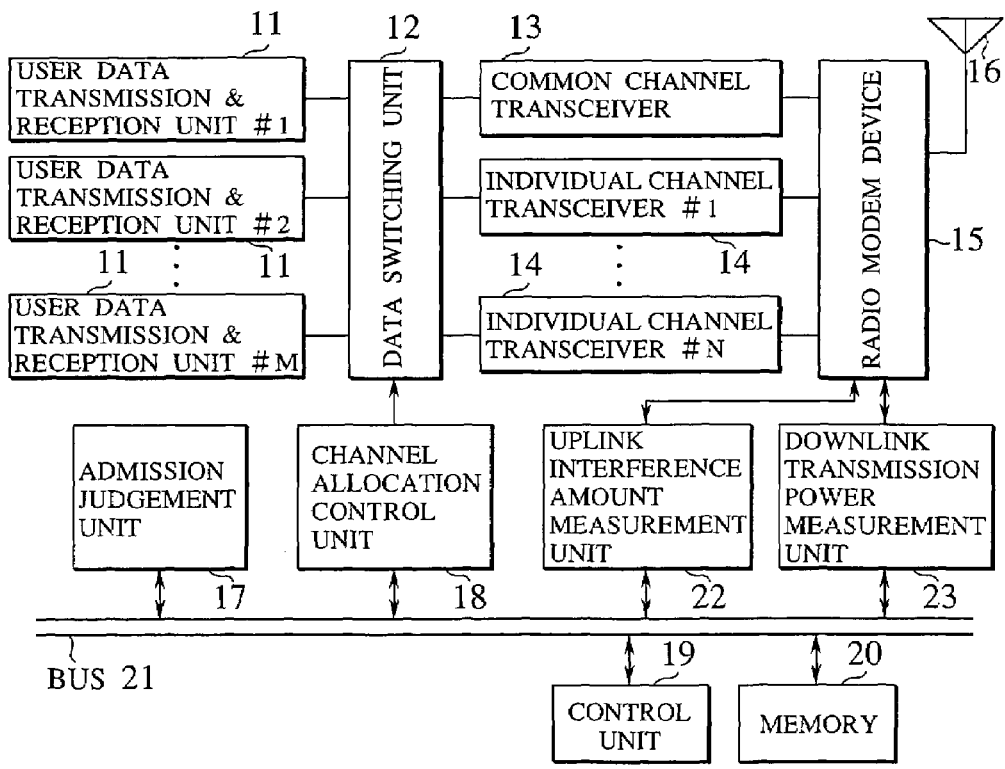
FIG. 7 is a block diagram showing a second exemplary configuration of a base station device according to one embodiment of the present invention.

FIG. 7 shows the second exemplary configuration of the base station device in the present embodiment. This exemplary configuration is an exemplary configuration for the case of using the uplink interference amount and/or the downlink transmission power level, in which an uplink interference amount measurement unit 22 and a downlink transmission power measurement unit 23 that are connected with the radio modem device 15 and the bus 21 are added to the configuration of FIG. 6 described above.

The uplink interference amount measurement unit 22 carries out a measurement of the uplink interference amount by controlling the radio modem device 15.

The downlink transmission power measurement unit 23 carries out a measurement of the downlink transmission power by controlling the radio modem device 15.

FIG. 8 shows the third exemplary configuration of the base station device in the present embodiment. This exemplary configuration is an exemplary configuration for the case of using the number of available spread codes and/or the number of available transceivers, in which a transceiver control/management unit 24 that is connected with the common channel transceiver 13, the individual channel transceivers 14 and the bus 21 is added to the configuration of FIG. 6 described above.

The transceiver control/management unit 24 manages the utilization status of the transceivers, and carries out a management of the spread codes in use by controlling the allocation of the spread codes to the respective transceivers.

FIG. 9 shows the fourth exemplary configuration of the base station device in the present embodiment. This exemplary configuration is an exemplary configuration for the case of controlling the transmission frequency on the common channel, in which a transmission frequency control unit 25 that is connected with the user data transmission and reception units 11 and the bus 21 is added to the configuration of FIG. 6 described above.

The transmission frequency control unit 25 carries out the transmission frequency control with respect to each user data transmission and reception unit 11.

FIG. 10 shows the fifth exemplary configuration of the base station device in the present embodiment. This exemplary configuration is an exemplary configuration for the case of controlling the signal transmission time on the individual channel, in which a transmission time control unit 26 that is connected with the user data transmission and reception units 11 and the bus 21 is added to the configuration of FIG. 6 described above.

The transmission time control unit 26 carries out the transmission time control with respect to each user data transmission and reception unit 11.

FIG. 11 shows the sixth exemplary configuration of the base station device in the present embodiment. This exemplary configuration is an exemplary configuration for the case of controlling the signal transmission time on the individual channel according to a random number, in which a random number generator 27 that is connected with the bus 21 is added to the configuration of FIG. 10 described above.

The random number generator 27 generates a random number for the purpose of the transmission time control by the transmission time control unit 26.

Next, with references to FIG. 12 to FIG. 16, exemplary configurations of a mobile station device in the present embodiment will be described.

Figure 12:
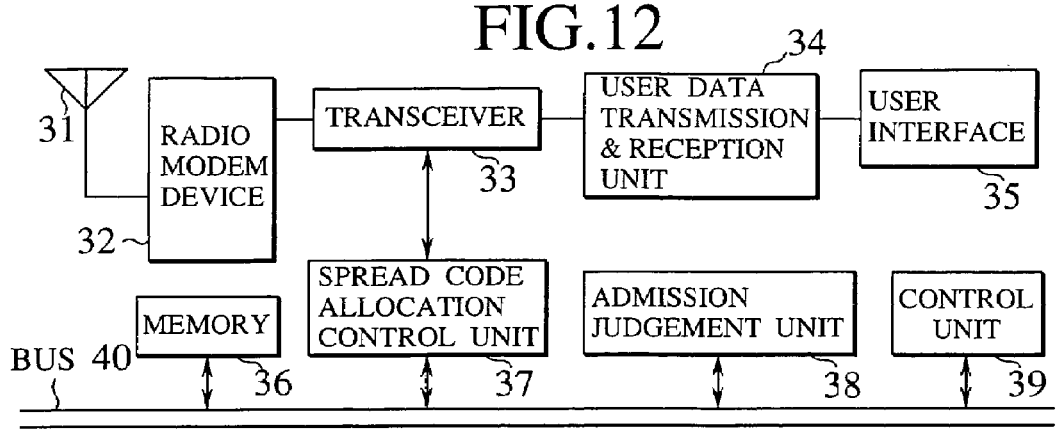
FIG. 12 is a block diagram showing a first exemplary configuration of a mobile station device according to one embodiment of the present invention.

FIG. 12 shows the first exemplary configuration of the mobile station device in the present embodiment. In this exemplary configuration, the mobile station device comprises an antenna 31, a radio modem device 32 connected with this antenna 31, a transceiver 33 connected with this radio modem device 32, a user data transmission and reception unit 34 connected with this transceiver 33, a user interface 35 connected with this user data transmission and reception unit 34, a memory 36, a spread code allocation control unit 37 connected with the transceiver 33, an admission judgement unit 38, a control unit 39, and a bus 40 for inter-connecting these memory 36, spread code allocation control unit 37, admission judgement unit 38 and control unit 39.

The radio modem device 32 carries out a spreading processing and a radio frequency modulation with respect to radio frames transmitted from the transceiver 33, and transmits them to the antenna 31. It also carries out a conversion to the baseband frequency and a despreading processing by tuning to radio signals received from the antenna 31.

The transceiver 33 carries out an error correction encoding and a processing for mapping onto radio frames as the processing necessary for transmitting data transmitted from the user data transmission and reception unit 34 onto the radio channel. It also carries out a processing for extracting from radio frames and decoding data transmitted from the base station on the radio channel.

The user data transmission and reception unit 34 carries out transmission and reception of user data.

The user interface 35 is an interface with respect to a user who operates the mobile station.

The memory 20 stores and memorizes data.

The spread code allocation control unit 37 carries out the spread code allocation control by controlling the transceiver 33.

The admission judgement unit 38 makes the judgement as to whether or not the allocation of the individual channel is possible (the judgement as to whether or not the admission of the shift from the common channel to the individual channel is possible).

The control unit 39 carries out an overall control of the mobile station device.

Figure 13:
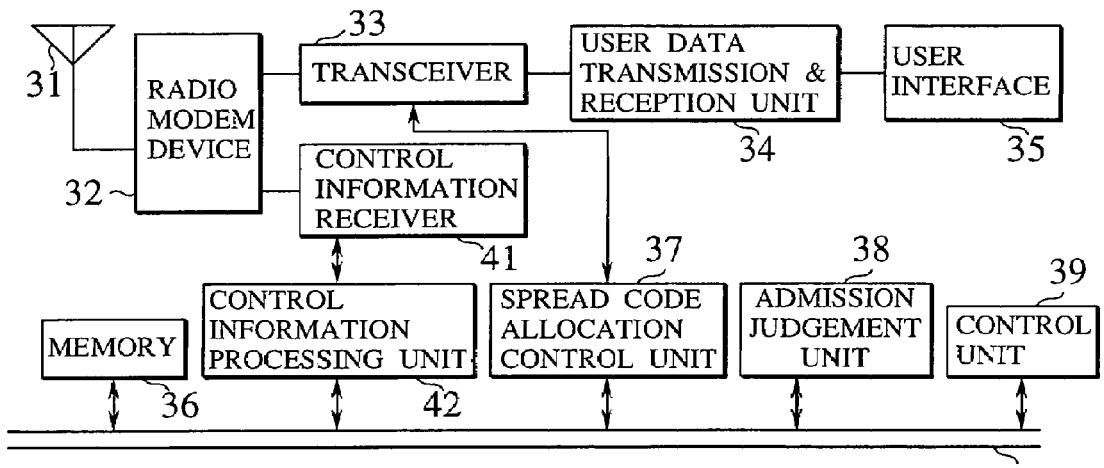
FIG. 13 is a block diagram showing a second exemplary configuration of a mobile station device according to one embodiment of the present invention.

FIG. 13 shows the second exemplary configuration of the mobile station device in the present embodiment. This exemplary configuration has a configuration in which a control information receiver 41 that is connected with the radio modem device 32 and a control information processing unit 42 that is connected with this control information receiver 41 and the bus 40 are added to the configuration of FIG. 12 described above.

The control information receiver 41 receives a control information such as the uplink interference amount and the downlink transmission power that is transmitted from the base station, and the control information processing unit 42 carries out the processing of this received control information.

Figure 14:
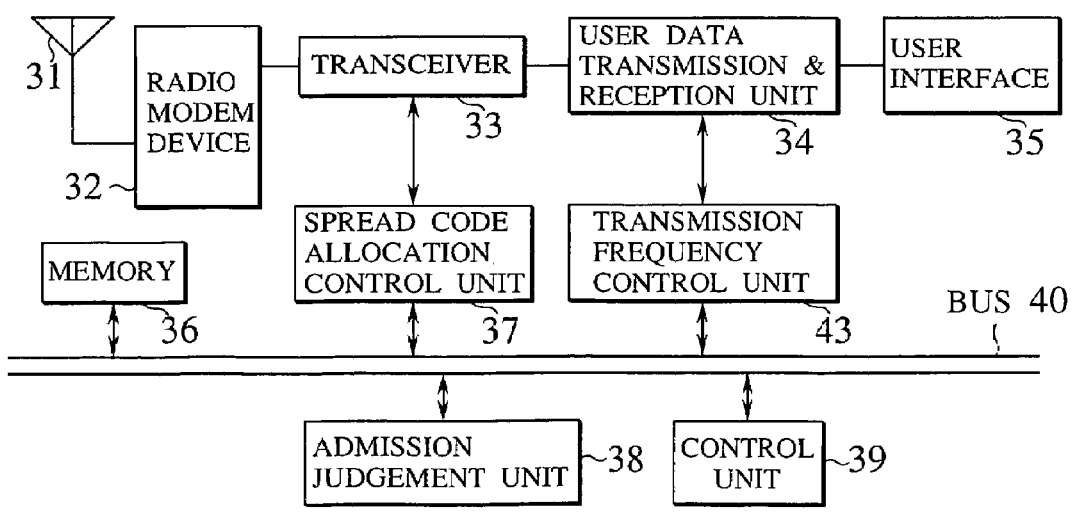
FIG. 14 is a block diagram showing a third exemplary configuration of a mobile station device according to one embodiment of the present invention.

FIG. 14 shows the third exemplary configuration of the mobile station device in the present embodiment. This exemplary configuration is an exemplary configuration for the case of controlling the transmission frequency on the common channel, in which a transmission frequency control unit 43 that is connected with the user data transmission and reception unit 34 and the bus 40 is added to the configuration of FIG. 12 described above.

The transmission frequency control unit 43 carries out the transmission frequency control with respect to the user data transmission and reception unit 34.

Figure 15:
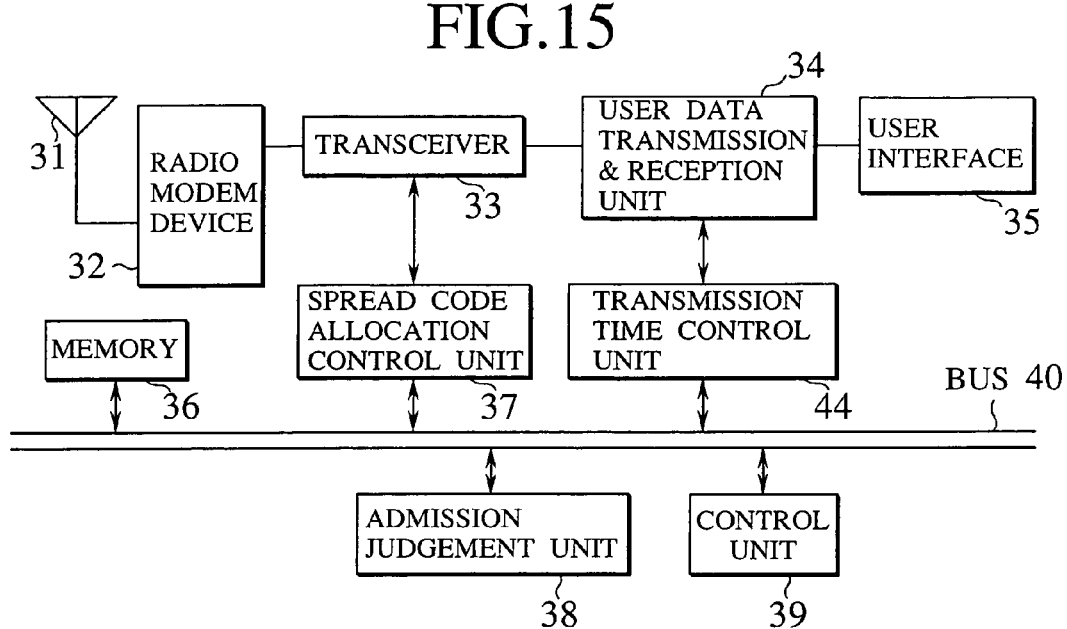
FIG. 15 is a block diagram showing a fourth exemplary configuration of a mobile station device according to one embodiment of the present invention.

FIG. 15 shows the fourth exemplary configuration of the mobile station device in the present embodiment. This exemplary configuration is an exemplary configuration for the case of controlling the signal transmission time on the individual channel, in which a transmission time control unit 44 that is connected with the user data transmission and reception unit 34 and the bus 40 is added to the configuration of FIG. 12 described above.

The transmission time control unit 44 carries out the transmission time control with respect to the user data transmission and reception unit 34.

Figure 16:
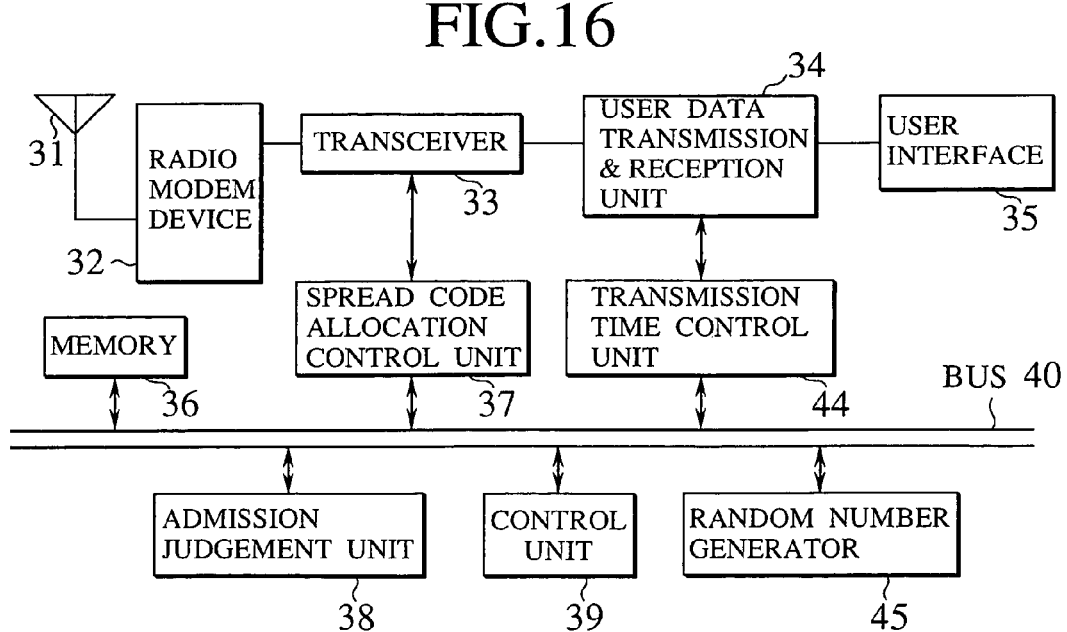
FIG. 16 is a block diagram showing a fifth exemplary configuration of a mobile station device according to one embodiment of the present invention.

FIG. 16 shows the fifth exemplary configuration of the mobile station device in the present embodiment. This exemplary configuration is an exemplary configuration for the case of controlling the signal transmission time on the individual channel according to a random number, in which a random number generator 45 that is connected with the bus 40 is added to the configuration of FIG. 15 described above.

The random number generator 45 generates a random number for the purpose of the transmission time control by the transmission time control unit 44.

As described above, according to the present invention, when a communication traffic at the mobile radio terminal is shifting from a sparse state to a dense state, the admission judgement for a shift from the common channel to the individual channel is carried out at the radio base station or the mobile radio terminal, between the radio base station and the mobile radio terminal, so that it is possible to realize the data traffic scheduling and achieve the improvement of the communication quality and the improvement of the radio band utilization efficiency in the mobile communication system.

Also, according to the present invention, the admission judgement for the shift from the common channel to the individual channel is carried out, at the radio base station according to information on an uplink interference amount and/or a downlink transmission power level, or at the mobile radio terminal according to information on the uplink interference amount and/or the downlink transmission power level that is transmitted from the radio base station, so that it is possible to reduce the interferences with respect to channels that are carrying out the data communications or interferences given to the others, and achieve the improvement of the communication quality.

In addition, according to the present invention, when an admission of the shift is not possible as a result of the admission judgement for the shift from the common channel to the individual channel so that the communication is to be kept on the common channel, data transmission is not carried out for a prescribed period of time or data transmission is carried out within a prescribed frequency, so that it is possible to prevent the degradation of the communication quality of the other users who are communicating in the same frequency band.

In addition, according to the present invention, when the shift from the common channel to the individual channel is to be attempted again after the admission of the shift is judged as not possible once, a timing for restarting an individual channel set up operation is set to be different from other mobile radio terminals, so that it is possible to reduce the increase of interferences.

Also, according to the present invention, because of the sequential control for each channel at the radio base station or the autonomous control at the mobile radio terminal, the scheduling of packet data that are generated burstily is realized without requiring a centralized control at the radio base station, so that it is possible to utilize the radio band effectively.

The invention claimed is:

1. A traffic control method for mobile data communications of a radio base station in a mobile communication system of a scheme using spread signals including CDMA, where two types of communication channels including a common channel and a plurality of individual channels are provided such that the common channel is set to be used by a plurality of users together and each individual channel is set to be used exclusively by one user, comprising:

carrying out a communication using the common channel, between a mobile radio terminal and said radio base station;

receiving at the radio base station an allocation request from the mobile radio terminal after the mobile radio terminal has detected an increase or a decrease of data traffic during the communication;

measuring, at the radio base station, an uplink reception interference level and a downlink transmission power level, and relaying the uplink reception interference level and the downlink transmission power level, along with respective uplink and downlink thresholds, to the mobile radio terminal; and shifting from the communication using the common channel to the communication using the individual channel between the mobile radio terminal and the radio base station, when the mobile radio terminal indicates that the uplink reception interference level and the downlink transmission power level are not greater than the respective uplink and downlink thresholds.

2. The traffic control method in mobile data communications as described in claim 1, characterized in that, when an admission of the shift is not possible as a result of the admission judgment for the shift from the common channel to the individual channel so that the communication is to be kept on the common channel, the radio base station and/or the mobile radio terminal are controlled such that data transmission is not carried out for a prescribed period of time or data transmission is carried out within a prescribed frequency, with regard to the communication.

3. The traffic control method in mobile data communications as described in claim 2, characterized in that, when an admission of the shift is not possible as a result of the admission judgment for the shift from the common channel to the individual channel so that the communication is to be kept on the common channel, and the shift from the common channel to the individual channel is to be attempted again after controlling the radio base station and/or the mobile radio terminal such that data transmission is not carried out for the prescribed period of time or data transmission is carried out within the prescribed frequency with regard to the communication, a timing for restarting an individual channel set up operation is controlled to be different from other mobile radio terminals.

4. The traffic control method in mobile data communications as described in claim 3, characterized in that the timing for restarting the individual channel set up operation is determined according to a random number.

5. A radio base station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, the radio base station comprising:

a communication unit configured to carry out a communication using the common channel with a mobile radio terminal and to receive an allocation request from the mobile radio terminal after the mobile radio terminal has detected an increase or a decrease of data traffic during the communication; and a measuring unit, at the radio base station, configured to measure an uplink reception interference level and a downlink transmission power level, and to relay the uplink reception interference level and the downlink transmission power level, along with respective uplink and downlink thresholds, to the mobile radio terminal, wherein the communication unit is configured to shift from the communication using the common channel to the communication using the individual channel with the mobile radio terminal, when the mobile radio terminal indicates that the uplink reception interference level and the downlink transmission power level are not greater than the respective uplink and downlink thresholds.

6. The radio base station as described in claim 5, characterized by having a data transmission control unit for controlling the radio base station and/or the mobile radio terminal such that data transmission is not carried out for a prescribed period of time or data transmission is carried out within a prescribed frequency, with regard to the communication, when an admission of the shift is not possible as a result of the admission judgment for the shift from the common channel to the individual channel so that the communication is to be kept on the common channel.

7. The radio base station as described in claim 6, characterized by having a transmission time control unit for controlling a timing for restarting an individual channel set up operation to be different from other mobile radio terminals, when an admission of the shift is not possible as a result of the admission judgment for the shift from the common channel to the individual channel so that the communication is to be kept on the common channel, and the shift from the common channel to the individual channel is to be attempted again after controlling the radio base station and/or the mobile radio terminal such that data transmission is not carried out for the prescribed period of time or data transmission is carried out within the prescribed frequency with regard to the communication.

8. The radio base station as described in claim 7, characterized in that the transmission time control unit determines the timing for restarting the individual channel set up operation according to a random number.

9. A mobile station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, the mobile station device comprising:
   a communication unit configured to carry out a communication using the common channel with a radio base station; and
   an admission judgment unit configured to detect an increase or a decrease of data traffic during the communication, to send an allocation request from the mobile station device to the radio base station upon detection of said increase or decrease of data traffic, and to carry out an admission judgment for a shift from the common channel to the individual channel, said admission judgment unit further configured to receive, from the radio base station in response to said allocation request, a measurement of an uplink reception interference level and a downlink transmission power level, along with respective uplink and downlink thresholds, and to determine whether or not the received measured uplink reception interference level and the downlink transmission power level are greater than the respective uplink and downlink thresholds, wherein
   the communication unit is configured to shift from the communication using the common channel to the communication using the individual channel with the radio base station, when the admission judgment unit determines that the uplink reception interference level and the downlink transmission power level are not greater than the respective uplink and downlink thresholds.

10. The mobile station device as described in claim 9, characterized by having a data transmission control unit for controlling the mobile station device and/or the radio base station such that data transmission is not carried out for a prescribed period of time or data transmission is carried out within a prescribed frequency, with regard to the communication, when an admission of the shift is not possible as a result of the admission judgment for the shift from the common channel to the individual channel so that the communication is to be kept on the common channel.

11. The mobile station device as described in claim 10, characterized by having a transmission time control unit for controlling a timing for restarting an individual channel set up operation to be different from other mobile radio terminals, when an admission of the shift is not possible as a result of the admission judgment for the shift from the common channel to the individual channel so that the communication is to be kept on the common channel, and the shift from the common channel to the individual channel is to be attempted again after controlling the mobile station device and/or the radio base station such that data transmission is not carried out for the prescribed period of time or data transmission is carried out within the prescribed frequency with regard to communication.

12. The mobile station device as described in claim 11, characterized in that the transmission time control unit determines the timing for restarting the individual channel set up operation according to a random number.

13. A traffic control method for mobile data communications of a radio base station in a mobile communication system of a scheme using spread signals including CDMA, where two types of communication channels including a common channel and a plurality of individual channels are provided such that the common channel is set to be used by a plurality of users together and each individual channel is set to be used exclusively by one user, comprising:
   carrying out a communication using the common channel, between a mobile radio terminal and said radio base station;
   receiving at the radio base station an allocation request from the mobile radio terminal after the mobile radio terminal has detected an increase or a decrease of data traffic during the communication;
   carrying out an admission judgment for a shift from the common channel to the individual channel at the radio base station, said admission judgment including determining whether or not the uplink reception interference level and the downlink transmission power level are greater than the respective uplink and downlink thresholds;
   relaying the admission judgment to the mobile radio terminal; and
   shifting from the communication using the common channel to the communication using the individual channel between the mobile radio terminal and the radio base station, when the uplink reception interference level and the downlink transmission power level are not greater than the respective uplink and downlink thresholds, wherein
   said step of carrying out an admission judgment is repeated upon receipt from the mobile radio terminal of a request to shift, said request to shift transmitted by the mobile radio terminal a predetermined time after the mobile radio terminal receives a negative admission judgment, said predetermined time being set by a timer in the mobile radio terminal.

14. The traffic control method in mobile data communications as described in claim 13, characterized in that, when an admission of the shift is not possible as a result of the admission judgment for the shift from the common channel to the individual channel so that the communication is to be kept on the common channel, the radio base station and/or the mobile radio terminal are controlled such that data transmission is not carried out for a prescribed period of time or data transmission is carried out within a prescribed frequency, with regard to the communication.

15. The traffic control method in mobile data communications as described in claim 14, characterized in that, when an admission of the shift is not possible as a result of the admission judgment for the shift from the common channel to the individual channel so that the communication is to be kept on the common channel, and the shift from the common channel to the individual channel is to be attempted again after controlling the radio base station and/or the mobile radio terminal such that data transmission is not carried out for the prescribed period of time or data transmission is carried out within the prescribed frequency with regard to the communication, a timing for restarting an individual channel set up operation is controlled to be different from other mobile radio terminals.

16. The traffic control method in mobile data communications as described in claim 15, characterized in that the timing for restarting the individual channel set up operation is determined according to a random number.

17. A radio base station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, the radio base station device comprising:

a communication unit configured to carry out a communication using the common channel with a mobile radio terminal; and an admission judgment unit configured to receive an allocation request from the mobile radio terminal after the mobile radio terminal has detected an increase or a decrease of data traffic during the communication, and to carry out an admission judgment for a shift from the common channel to the individual channel, said admission judgment unit further configured to determine whether or not the uplink reception interference level and the downlink transmission power level are greater than the respective uplink and downlink thresholds and to relay the admission judgment to the mobile radio terminal, wherein the communication unit is configured to shift from the communication using the common channel to the communication using the individual channel with the mobile radio terminal, when the uplink reception interference level and the downlink transmission power level are not greater than the respective uplink and downlink thresholds, and said admission judgment unit is further configured to re-perform said admission judgment upon receipt from the mobile radio terminal of a request to shift, said request to shift transmitted by the mobile radio terminal a predetermined time after the mobile radio terminal receives a negative admission judgment from the radio base station device, said predetermined time being set by a timer in the mobile radio terminal.

18. The radio base station device as described in claim 17, characterized by having a data transmission control unit for controlling the radio base station device and/or the mobile radio terminal such that data transmission is not carried out for a prescribed period of time or data transmission is carried out within a prescribed frequency, with regard to the communication, when an admission of the shift is not possible as a result of the admission judgment for the shift from the common channel to the individual channel so that the communication is to be kept on the common channel.

19. The radio base station device as described in claim 18, characterized by having a transmission time control unit for controlling a timing for restarting an individual channel set up operation to be different from other mobile radio terminals, when an admission of the shift is not possible as a result of the admission judgment for the shift from the common channel to the individual channel so that the communication is to be kept on the common channel, and the shift from the common channel to the individual channel is to be attempted again after controlling the radio base station device and/or the mobile radio terminal such that data transmission is not carried out for the prescribed period of time or data transmission is carried out within the prescribed frequency with regard to the communication.

20. The radio base station device as described in claim 19, characterized in that the transmission time control unit determines the timing for restarting the individual channel set up operation according to a random number.

21. A mobile station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, comprising:

a communication unit configured to carry out a communication using the common channel with a radio base station; and an admission judgment unit configured to detect an increase or a decrease of data traffic at the mobile station device during the communication, and to carry out an admission judgment for a shift from the common channel to the individual channel at the radio base station or the mobile station device, said admission judgment including sending an allocation request after detecting said increase or decrease of data traffic and including subsequently receiving from the radio base station an indication of whether or not the uplink reception interference level and the downlink transmission power level are greater than the respective uplink and downlink thresholds, wherein the communication unit is configured to shift from the communication using the common channel to the communication using the individual channel with the radio base station, when the uplink reception interference level and the downlink transmission power level are not greater than the respective uplink and downlink thresholds, and said admission judgment unit is configured to perform another admission judgment a predetermined time after the mobile station device generates a negative admission judgment, said predetermined time being set by a timer in the mobile station device.

22. The mobile station device as described in claim 21, characterized by having a data transmission control unit for controlling the mobile station device and/or the radio base station such that data transmission is not carried out for a prescribed period of time or data transmission is carried out within a prescribed frequency, with regard to the communication, when an admission of the shift is not possible as a result of the admission judgment for the shift from the common channel to the individual channel so that the communication is to be kept on the common channel.

23. The mobile station device as described in claim 22, characterized by having a transmission time control unit for controlling a timing for restarting an individual channel set up operation to be different from other mobile radio terminals, when an admission of the shift is not possible as a result of the admission judgment for the shift from the common channel to the individual channel so that the communication is to be kept on the common channel, and the shift from the common channel to the individual channel is to be attempted again after controlling the mobile station device and/or the radio base station such that data transmission is not carried out for the prescribed period of time or data transmission is carried out within the prescribed frequency with regard to communication.

24. The mobile station device as described in claim 23, characterized in that the transmission time control unit determines the timing for restarting the individual channel set up operation according to a random number.

25. A traffic control method for a mobile station device in a mobile communication system of a scheme using spread signals including CDMA, where two types of communication channels including a common channel and a plurality of individual channels are provided such that the common channel is set to be used by a plurality of users together and each individual channel is set to be used exclusively by one user, comprising:

carrying out a communication using the common channel with a radio base station;

detecting at the mobile station device an increase or a decrease of data traffic during the communication;

sending an allocation request to the radio base station upon detection of said increase or decrease of data traffic;

receiving, from the radio base station in response to said allocation request, a measurement of an uplink reception interference level and a downlink transmission power level, along with respective uplink and downlink thresholds;

determining whether or not the received measured uplink reception interference level and the downlink transmission power level are greater than the respective uplink and downlink thresholds; and shifting from the communication using the common channel to the communication using the individual channel with the radio base station when the uplink reception interference level and the downlink transmission power level are not greater than the respective uplink and downlink thresholds.

26. A traffic control method for mobile data communications of a mobile radio terminal in a mobile communication system of a scheme using spread signals including CDMA, where two types of communication channels including a common channel and a plurality of individual channels are provided such that the common channel is set to be used by a plurality of users together and each individual channel is set to be used exclusively by one user, comprising:

carrying out a communication using the common channel with a radio base station;

receiving an allocation request from the mobile radio terminal after the mobile radio terminal has detected an increase or a decrease of data traffic during the communication;

carrying out an admission judgment for a shift from the common channel to the individual channel, including determining whether or not the uplink reception interference level and the downlink transmission power level are greater than the respective uplink and downlink thresholds;

relaying the admission judgment to the mobile radio terminal;

shifting from the communication using the common channel to the communication using the individual channel with the mobile radio terminal, when the uplink reception interference level and the downlink transmission power level are not greater than the respective uplink and downlink thresholds, and re-performing said admission judgment upon receipt from the mobile radio terminal of a request to shift, said request to shift transmitted by the mobile radio terminal a predetermined time after the mobile radio terminal receives a negative admission judgment from the radio base station, said predetermined time being set by a timer in the mobile radio terminal.

* * * * *